Patented Mar. 24, 1936

2,035,348

UNITED STATES PATENT OFFICE 2,035,348

RESINOUS COMPOSITION

Caryl Sly, Wilmington, Del., assignor to E. I. du Pont de Nemours & Company, Wilmington, Del., a corporation of Delaware No Drawing. Original application May 3, 1932, Serial No. 609,026. Divided and this application October 13, 1933, Serial No. 693,525

11 Claims. (Cl. 260—8)

This invention relates to resin-like products and more particularly to new resinous compositions comprising the reaction products of polyhydric alcohols and substances of a protein nature.

It has been proposed to make plastic material by heating yeast with esters of polyhydric alcohols, as for instance with the phthalic acid ester of glycerol. According to this prior method the yeast, before it is heated with the ester, may be liquefied by heating or given a preliminary heat treatment with glycerol or other suitable wetting agent. In this preliminary heat treatment of the yeast with glycerol the temperature is below that which will cause the yeast to decompose. Low temperatures, below 100° C. at diminished pressure, are also used in heating the yeast with the polyhydric alcohol ester.

This invention has as an object the production of new compositions of matter from proteins, polyhydric alcohols and organic acids. Other objects will appear hereinafter.

I have discovered that when a protein and a polyhydric alcohol are heated together at a sufficiently high temperature (e. g. 140°) in the presence of a catalyst, a reaction between the protein and polyhydric alcohol takes place with the production of resinous compositions markedly different from the "undecomposed", i. e. unreacted mixtures of yeast and glycerol, produced in accordance with the method referred to above. I have further discovered that the incorporation of certain modifying agents, especially organic acids, into the reaction mixture results in the formation of resins which are particularly valuable for the various purposes for which resins are utilized.

In making my new resin-like materials my preferred method consists in fusing the polyhydric alcohol with the protein in the presence of an alkaline catalyst such as sodium hydroxide and then adding the additional resin ingredients, if any. Or, if desired, all of the ingredients, including the catalyst, may be fused simultaneously. As catalysts I may use sodium hydroxide, lime, potassium hydroxide, hydrochloric, sulfuric and phosphoric acids, alkali and alkaline earth alcoholates, glycerates, glycolides, etc.

Either open or closed vessels may be employed. Stirring is strongly recommended because in many cases local over-heating will cause the protein to char before it is acted upon by the polyhydric alcohol. As a general rule, 30–45 minutes at 150–165° C. is a sufficient period of heating for the polyhydric alcohol-protein mixture, though this is by no means limiting. Somewhat different conditions are desirable if the other resin ingredients are to be added at a later stage, particularly, if the ingredients are of an acidic nature. In such cases the polyhydric alcohol-protein mixture is heated on the same schedule (30–45 minutes at 150–165° C.), the other ingredients then added and heating resumed, one hour up to 200° C. and 2–8 hours at 200° C.

In nearly all cases, whether with or without a modifying agent, the preferred, but not limiting, ratio of ingredients is one part protein and two parts polyhydric alcohol. Where additional modifying agents of an acidic nature are used, the amounts of these are preferably, but not necessarily, less than that which will be chemically equivalent to the polyhydric alcohol present.

The method of practicing my invention is more specifically illustrated by reference to the following examples, in which the parts are by weight:

Example I

A small portion of casein is heated in an open vessel with twice its weight of glycerol and 1.0% by weight sodium hydroxide (based on the casein). The temperature is brought gradually to 150–165° C. over a period of 15 minutes with continual stirring, and then held at this point for an additional 30 minutes. This product is a clear liquid at 100° but rubbery and very slightly opaque on cooling to room temperature. This material while hot may be pressed between two hot pieces of glass until air bubbles disappear. On cooling a piece of sandwich glass is obtained in which the glass plates are firmly held together.

Example II

Fourteen and nine-tenths (14.9) parts glycerol, 35.1 parts phthalic anhydride and 10.0 grams sheet gelatin (broken into small pieces) are heated with stirring in an open aluminum vessel, one hour up to 200° C. and 4 hours at 200° C., or to an acid number of 65–70. Some difficulty may be experienced in the early stages in making the bulky masses of gelatin mix with the other materials. This resin may be used as the sandwiching material for glass, or dissolved in a solvent such as acetone and used as an adhesive or impregnating agent.

In addition to the polybasic acid, it is usually desirable to include other modifying agents such as drying oil acids, the protein being preferably preheated with the polyhydric alcohol before the addition of the remaining ingredients as indicated in the following example:

Example III

Ninety-nine and four-tenths (99.4) parts glycerol, 36.4 parts casein and 0.5 parts sodium hydroxide are heated and stirred under a short air-cooled reflux condenser. The temperature is raised to 150° C. over a period of fifteen minutes, then maintained in the range 150–165° C. for 20 minutes. At the end of this period, the mixture is slightly dark, but quite clear. One hundred fifty-five and eight-tenths (155.8) parts linseed oil acids, 62.3 parts China-wood oil acids and 146.0 parts phthalic anhydride are added directly to the above product. Heating is resumed, the temperature being carried to 200° C. over a period of one hour, then maintained at this point for 5 hours. At the end of the second hour at 200° C., the air condenser is removed. This resin has an acid number of 17.8, and is medium to dark in color, homogeneous, and fairly soft. In this formula, an excess of glycerol over that which is chemically equivalent to all the acidic ingredients is employed. This product is a valuable resin for the formulation of lacquers and enamels, especially in combination with cellulose derivatives.

Various modifications in procedure, such as blowing the reaction mixture with an inert gas, the use of either water or air-cooled reflux condensers, the use of alkaline catalysts other than sodium hydroxide, e. g., lime, or the use of acid catalysts, e. g., hydrochloric acid, will readily occur to those skilled in the art. The catalyst may be used in amounts from 0.1% to 10% instead of from 0.5% to 1.0%. Vessels of different metals, such as iron, aluminum or Monel, may be used. It is frequently advantageous to add the protein to the polyhydric alcohol in small portions while the latter is being heated, over an extended period of time; for example, the polyhydric alcohol, if a solid at ordinary temperatures, is first melted, the catalyst added, and the protein substance then introduced in small portions, heating and stirring being continued. The modifying agents may, if desired, be added at any stage of the reaction. The heat schedules and temperatures mentioned in the examples, while preferred as a rule, can be varied considerably according to the nature and amounts of modifying agents present. Satisfactory products may be made with a temperature range of 140–250° C. The time of heating may vary from that necessary to form an essentially homogeneous product up to as long as 10–12 hours when acidic modifying ingredients are added. When the products are intended for use in coating compositions, the heating should be discontinued before the insoluble infusible stage is reached. When that part of the polyhydric alcohol which is uncombined with the protein is esterified; i. e., when the resin is modified further with organic acids, the progress of the reaction may be followed by determination of the acid number. The heating is stopped when the resin has the optimum acid number and viscosity characteristics; i. e., the lowest practicable acid number at the lowest practicable viscosity (the viscosity increasing rapidly toward the end of the reaction while the acid number decreases relatively slowly).

In carrying out my invention, I may use, instead of or in addition to glycerol, other polyhydric alcohols such as ethylene glycol and higher homologs, octadecanediol, diethylene glycol, and other polyglycols, triethanolamine, sorbitol, polyglycerols, and alkyl and aryl ethers of polyhydric alcohols having at least two hydroxyl groups, such as monobenzylin and the diethyl ether of pentaerythritol. Various other acids may be used as modifying ingredients and among these there may be mentioned succinic, adipic, tartaric, maleic, citric, dilactylic, diphenic, naphthalic, hexahydrophthalic, quinolinic, and chlorophthalic acids or anhydrides, as well as other monobasic acids such as butyric acid, benzoic acid, salicyclic acid, oleic acid, stearic acid, perilla oil acids, soya bean oil acids, cottonseed oil acids, coconut oil acids, and abietic acid. The fatty oils themselves may also be incorporated into my new resins, but with the exception of castor oil and like hydroxy esters, it is preferred to use the fatty oil mono- and/or diglycerides (or the equivalent esters of other polyhydric alcohols) obtained by heating the oil and glycerol or other polyhydric alcohol, in the presence of an alcoholysis catalyst such as litharge or sodium hydroxide. Natural resins such as rosin, Congo and Kauri, semi-synthetic resins such as ester gum, and monohydric alcohols such as n-butyl, benzyl, cyclohexyl, ethoxyethyl, ethoxyethoxyethyl and ethyl lactate are also valuable modifying agents.

As proteinic substances, I prefer to use casein, gelatin and egg albumin. A large number of other protein substances are, however, useful for the purposes of the present invention. Additional types of proteins that may be mentioned are: protamines, polypeptides, dipeptides, globulin, gluten proteins, acid albumins or syntonins, albuminates, fibrins, peptones, propeptones or albumoses, coagulated albumins, elastin, fibroin, etc. Those proteins which are difficult to incorporate can usually be hydrolyzed to a simpler unit, as for instance the peptides and polypeptides, which can be more easily combined. I desire to have it understood that by protein I mean not only the naturally occurring proteins but also their primary degradation products such as the poly- and di-peptides. While protein hydrolytic products are in general suitable I do not, however, mean to include the ultimate degradation products, e. g. amino acids.

My new protein-polyhydric alcohol reaction products find various uses in the arts and are particularly useful in the manufacture of adhesives. The field of usefulness of the products is, however, widely increased through the incorporation of the various modifying agents heretofore mentioned, the resinous products being especially valuable for the manufacture of coating compositions as illustrated by the following example:

Example IV

A portion of the resin obtained in Example III is thinned with "Hi-flash" naphtha to a viscosity of 33 seconds at 77° F. in the No. 10 brass cup. The solution so obtained is baked over an asphaltic priming composition on a heat schedule of 12 minutes up to 230° C. and 18 minutes at 230° C. The film shows a high gloss and is remarkably hard and tough, yet at the same time sufficiently flexible for the steel to be bent or pressed into various shapes without cracking the film.

The lacquers, enamels and varnishes may include the usual solvents, driers, antioxidants, plasticizers, pigments and combinations with nitrocellulose or other cellulose derivatives which are compatible with the resins, such as ethyl and benzyl cellulose.

My new resins, especially in their unmodified form (i. e. without the inclusion of acidic or other modifying agents) are particularly useful as the sandwiching material or adhesive therefor in the manufacture of safety glass. The new resins can also be combined with mica for the manufacture of insulating materials, or combined with cellulose derivatives, cellulose acetate being especially suitable, for the manufacture of laminated products. Molding plastics may be made from my resins, for which purpose various fillers such as wood flour, magnesite, etc., may be added and any conventional method of mixing and molding used. The products of this invention are also suitable for use as impregnating, toughening, or water-proofing agents for porous surfaces and materials, such as textiles, paper, porous stone, wood pulp, etc.; for coating rubber coated, oil varnished or nitrocellulose coated fabrics such as paper and cloth, for coating laminating and cementing paper, cloth, felt, "Cellophane", wood, resinous materials, metal, particularly metal foil, etc.

The claims in this case are directed to the resinous reaction products of a protein, a polyhydric alcohol, and an organic acid. The resin-like reaction products obtained by reacting protein and polyhydric alcohol in the absence of organic acid are claimed in my application, Serial No. 609,026, filed May 3, 1932, now Patent 2,009,029 of which this case is a division.

As many apparently different embodiments of this invention may be made without departing from the spirit and scope thereof, it is to be understood that I do not limit myself to the specific embodiments thereof except as defined in the following claims:

I claim:

1. The reaction product of ingredients comprising a polycarboxylic acid and the product obtained by heating together a protein and a polyhydric alcohol at a temperature of at least 140° C. in the presence of an alkaline catalyst.

2. The resin-like reaction product set forth in claim 1 in which the polycarboxylic acid is phthalic and the polyhydric alcohol is glycerol.

3. The reaction product set forth in claim 1 in which the protein is chosen from the class consisting of casein, gelatin, and albumen.

4. The reaction product set forth in claim 1 in which the ratio of polyhydric alcohol to protein is at least two to one.

5. The resin-like reaction product of phthalic anhydride and the product obtained by heating together glycerol and casein at a temperature of at least 140° C. in the presence of an alkaline catalyst.

6. A process which comprises reacting with heat treatment ingredients comprising polycarboxylic acid and the product obtained by heating a protein and polyhydric alcohol at a temperature of at least 140° C. in the presence of an alkaline catalyst.

7. The process set forth in claim 6 in which the polycarboxylic acid is phthalic and the polyhydric alcohol is glycerol.

8. The process set forth in claim 6 in which the protein is casein.

9. The process set forth in claim 6 in which the ratio of polyhydric alcohol to protein is at least two to one.

10. The process set forth in claim 6 in which the catalyst constitutes from 1% to 10% by weight of the ingredients.

11. A process which comprises heating protein and polyhydric alcohol 30 to 45 minutes at a temperature of from 150–165° C., and heating the reaction product obtained with polycarboxylic acid 2 to 8 hours at about 200° C.

CARYL SLY.